(12) United States Patent
Sasahara

(10) Patent No.: US 10,196,034 B2
(45) Date of Patent: Feb. 5, 2019

(54) SEAT BELT RETRACTOR

(71) Applicant: Autoliv Development AB, Vårgårda (SE)

(72) Inventor: Takaomi Sasahara, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 40 days.

(21) Appl. No.: 15/519,601

(22) PCT Filed: Aug. 31, 2015

(86) PCT No.: PCT/JP2015/074807
§ 371 (c)(1),
(2) Date: Jun. 1, 2017

(87) PCT Pub. No.: WO2016/063634
PCT Pub. Date: Apr. 28, 2016

(65) Prior Publication Data
US 2017/0259779 A1   Sep. 14, 2017

(30) Foreign Application Priority Data
Oct. 22, 2014   (JP) .................................. 2014-215596

(51) Int. Cl.
*B60R 22/28* (2006.01)
*B60R 22/34* (2006.01)
*B60R 22/46* (2006.01)

(52) U.S. Cl.
CPC .............. *B60R 22/28* (2013.01); *B60R 22/34* (2013.01); *B60R 22/3413* (2013.01);
(Continued)

(58) Field of Classification Search
CPC ..... B60R 22/28; B60R 22/34; B60R 22/3413; B60R 22/4676; B60R 2022/287; B60R 2022/288
See application file for complete search history.

(56) References Cited

U.S. PATENT DOCUMENTS 5,961,060 A   10/1999   Brambilla et al.
6,105,894 A    8/2000   Singer et al.
(Continued)

FOREIGN PATENT DOCUMENTS

CN   102395491 A       3/2012
DE   201 13 834 U1     3/2002
(Continued)

OTHER PUBLICATIONS

Japan Patent Office, 3-4-3, Kasumigaseki, Chiyoda-ku, Tokyo 100-8915, Japan, International Search Report for International Application No. PCT/JP2015/074807, dated Nov. 17, 2015, 1 pg., Form PCT/ISA/2010.
German Examination Report dated Apr. 15, 2013.

*Primary Examiner* — Sang K Kim
(74) *Attorney, Agent, or Firm* — Brinks Gilson & Lione

(57) ABSTRACT

A switching mechanism (100) in a force limiter mechanism of a seat belt retractor including: a locking mechanism including a locking element (68) that locks a torque tube (64) with respect to a spindle (61) so that the torque tube (64) rotates together with the spindle (61) and a spindle ring (70); a switch ring (120) rotatable to unlock the locking mechanism; and a switch housing (101) that stores the switch ring (120), a switch piston (115) adapted to activate the switch ring (120). A switching gas generator (116) generates gas for pushing out the switch piston (115) upon activation of the switching mechanism. The switch housing (101) of the switching mechanism (100) has a protrusion (110) that protrudes in an incoming direction of an operated part (122) at an abutment part hit by the switch ring (120) rotated by the switch piston (115) to control movement of the switch ring.

7 Claims, 11 Drawing Sheets

(52) U.S. Cl.
CPC .... *B60R 22/4676* (2013.01); *B60R 2022/287* (2013.01); *B60R 2022/288* (2013.01)

(56) References Cited

U.S. PATENT DOCUMENTS

| | | | |
|---|---|---|---|
| 6,206,315 | B1 | 3/2001 | Wier |
| 6,241,172 | B1 | 6/2001 | Fugel et al. |
| 6,616,081 | B1 | 9/2003 | Clute et al. |
| 6,745,970 | B2 | 6/2004 | Wier |
| 7,669,794 | B2 * | 3/2010 | Boelstler ............. B60R 22/3413 242/379.1 |
| 8,740,125 | B2 * | 6/2014 | Ogawa ................ B60R 22/4628 242/379.1 |
| 2001/0006204 | A1 | 7/2001 | Kajliyama |
| 2004/0262441 | A1 | 12/2004 | Hiramatsu |
| 2006/0131456 | A1 | 6/2006 | Romero |
| 2007/0075173 | A1 | 4/2007 | Boelstler et al. |
| 2008/0061180 | A1 | 3/2008 | Webber et al. |
| 2011/0315805 | A1 | 12/2011 | Yanagawa et al. |
| 2012/0043407 | A1 | 2/2012 | Ogawa et al. |

FOREIGN PATENT DOCUMENTS

| | | |
|---|---|---|
| DE | 199 27 427 C2 | 11/2002 |
| DE | 103 07 430 B3 | 7/2004 |
| DE | 10 2009 024 292 A1 | 12/2010 |
| JP | 2003-502204 A | 1/2003 |
| JP | 2012-006447 A | 1/2012 |
| WO | WO 2010/119778 A1 | 10/2012 |

* cited by examiner (PRIOR ART)

(PRIOR ART)

SEAT BELT RETRACTOR

CROSS REFERENCE TO RELATED APPLICATIONS

This application claims priority to Japanese Patent Application No. 2014-215596, filed on Oct. 22, 2014 and PCT/JP2015/074807, filed on Aug. 31, 2015.

FIELD OF THE INVENTION

The present invention relates to seatbelt retractors, and more specifically to a seatbelt retractor having a force limiter mechanism capable of switching between energy absorption loads.

BACKGROUND

Recent seatbelt retractors additionally include a pretensioner adapted to instantly wind up a belt upon a vehicle collision and effectively restrain the body of an occupant and a force limiter mechanism adapted to reel out the belt wedding while absorbing energy if a set load or higher is applied on the belt which has the effect of reducing a load upon the chest of the occupant. An example of such that the device is provided by referenced to PCT Application No. 2003-502204.

As shown in FIG. 10 appended to this specification, a seatbelt retractor disclosed in PCT Application No. 2003-502205 includes a force limiter mechanism in which a torsion bar (twist bar) 213 absorbs energy as the bar is twisted and plastically deforms, so that the belt is unreeled for a prescribed amount. The torsion bar 213 has a section 214 having a larger cross section and a section 215 having a smaller cross section and includes connecting pieces 216a and 216b at intermediate parts of the sections 214 and 215 and one end of the torsion bar 213. The connection piece 216b is coupled to a spindle (belt shaft) 212, and the connection piece 216a is coupled to a torque tube (torque pipe) 218. The torsion bar 213 is connected to a tread head (profile head) 250 at the other end.

The force limiter mechanism includes a switching mechanism that switches energy absorption from a high force level to a low force level. As shown in FIG. 11, the switching mechanism carries out energy absorption in a high force level to the section 214 of the torsion bar 213 through the torque tube 218 from a spindle 212 while a locking element (nail) 221 couples the spindle 212 and the torque tube 218. When the locking element 221 is detached from the torque tube 218, the section 215 of the torsion bar 213 is twisted from the spindle 212, and energy absorption in a low force level is carried out.

The locking element 221 is swingably supported around a rotation center 222 in a notch 240 formed at a cross section of the spindle 212. The locking element 221 is held in engagement with the torque tube 218 while the outer circumferential side thereof is surrounded by a spindle ring (shaft ring) 245. When the spindle ring 245 is moved in the axial line direction, the locking element 221 is released from the support 224 of the spindle ring 245 and swings outward in the notch 240, so that the spindle 212 and the torsion bar 213 are detached from each other.

6As shown in FIG. 12, a driving device 226 having a pyrotechnic filler 227 is provided in the cover 220 of a belt winding-up device 210, and the filler 227 functions to linearly move a piston 228. The piston 228 makes an access to a step 229 that radially protrudes from a switch ring (operation ring) 219, which rotates the switch ring 219, and the rotation pushes and moves the spindle ring 245 away from the cover 220 in the axial line direction.

In the switching mechanism of the force limiter mechanism disclosed in PCT Application No. 2003-502204, the switch ring 219 is driven to rotate by the activation of the piston 228 in a stable manner by setting strict dimensional tolerances for the piston 228 and the switch ring 219 themselves and their peripherals. Therefore, strict dimension management is necessary in the switching mechanism, which increases the cost.

The present invention is in view of the problem and it is an object of the present invention to provide a seatbelt retractor that allows the switching mechanism of the force limiter mechanism to have improved operation stability while achieving cost reduction.

The object of the present invention is achieved by the following configurations.

A seatbelt retractor including a retractor frame, a spindle rotatably supported at the retractor frame and capable of winding up a seatbelt therearound, a torsion bar provided in the spindle and having one end coupled to the spindle and a plurality of shaft parts having different torsional torque characteristics, an emergency locking mechanism capable of locking rotation of the spindle by locking the other end of the torsion bar, a torque tube coupled to the torsion bar between the plurality of shaft parts and provided in the spindle, and a switching mechanism implementing switching between a state in which the torque tube rotates together with the spindle and a state in which the torque tube rotates relatively to the spindle, the switching mechanism includes a locking mechanism locking the torque tube with respect to the spindle so that the torque tube rotates together with the spindle, a switching member capable of rotating to unlock the locking mechanism, and a housing storing the switching member, a driving member adapted to activate the switching member, and a gas generator that generates gas for pushing out the driving member upon activation of the switching mechanism, and the housing of the switching mechanism has a protrusion that protrudes in an incoming direction of the switching member at an abutment part hit by the switching member when the switching member is rotated by the driving member.

In a further embodiment the seatbelt retractor described above in which the protrusion deforms when the switching member hits the protrusion.

In a still further embodiment is seatbelt retractor described previously in which the locking mechanism includes a locking member attached on the spindle side in a through hole provided radially through the spindle and rotatable between a locking position in which the torque tube is locked with respect to the spindle so that the torque tube rotates together with the spindle and an unlocking position in which the torque tube is unlocked from the spindle so that the torque tube rotates relatively to the spindle, and a restriction ring radially abutting against the locking member to restrict the locking member in the locking position, the switching member is a switch ring having an operated part that is movable axially from a position, in which the restriction ring abuts against the locking member, to a position apart from the locking member and that is allowed to protrude radially and hit the protrusion at the abutment part, and the protrusion extends axially to protrude in the incoming direction of the switching member.

In a still further embodiment is the seatbelt retractor described previously in which the housing of the switching mechanism includes a plurality of ramp surfaces inclined in a moving direction of the switch ring at a sliding surface on which the switch ring slides, and the switch ring moves axially by sliding along the plurality of ramp surfaces while rotating in a circumferential direction by activation of the driving member.

In the seatbelt retractor according to the present invention, the housing of the switching mechanism has the protrusion that protrudes in an incoming direction of the switching member at an abutment part hit by the switching member when the switching member is rotated by the driving member. In this way, the switching member activated by the driving member is restricted from axially shifting by the protrusion of the housing and operates stably, so that the switching mechanism of the force limiter mechanism may have improved operation stability while achieving cost reduction.

DETAILED DESCRIPTION OF INVENTION

Now, a seatbelt retractor according to one embodiment of the present invention will be described in detail with reference to FIG. 1 to FIG. 9.

Figure 1:
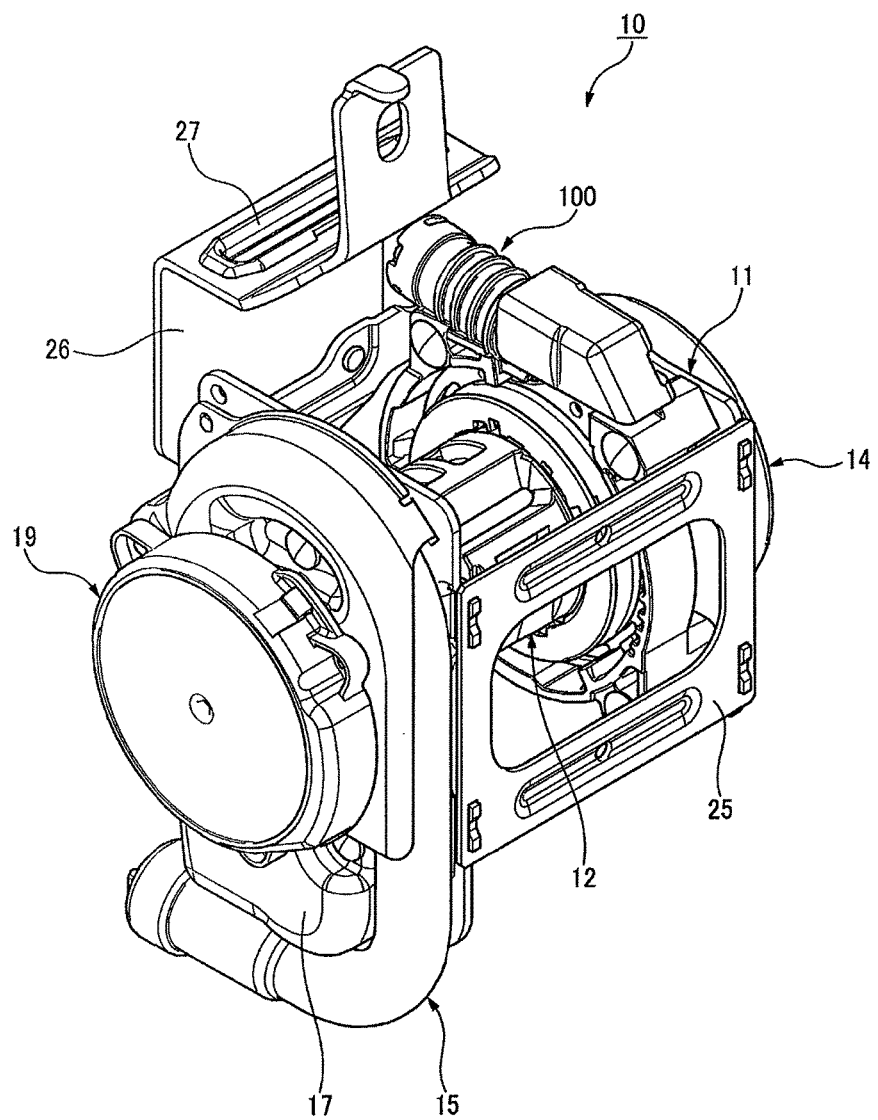
FIG. 1 is a perspective view of a seatbelt retractor according to one embodiment of the present invention.
Figure 2:
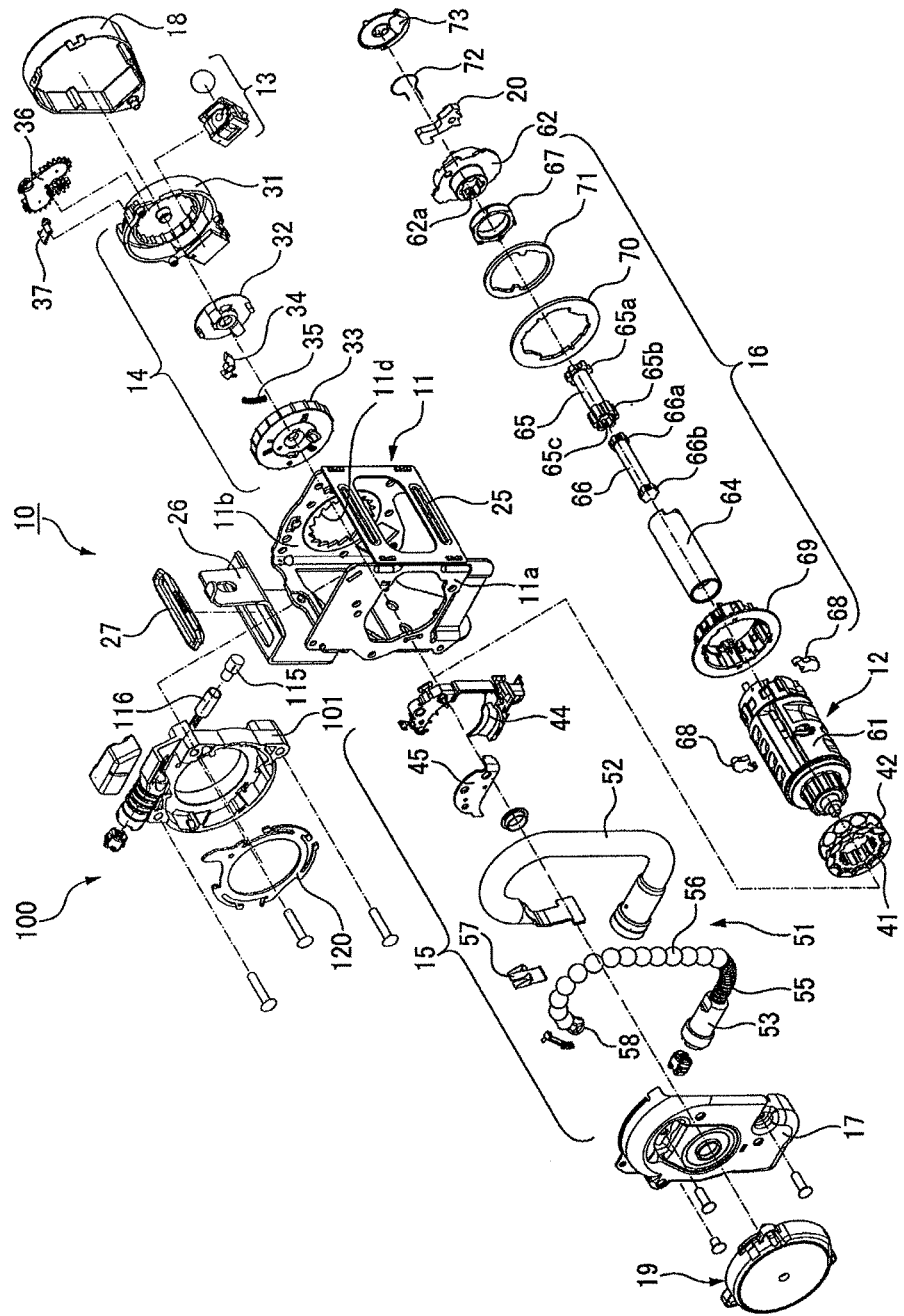
FIG. 2 is an exploded perspective view of the seatbelt retractor in FIG. 1.

As shown in FIG. 1 and FIG. 2, the seatbelt retractor 10 includes a spindle assembly 12 supported rotatably at a retractor frame 11 to wind up a seatbelt (not shown), a winding-up spring device 19 that biases the spindle assembly 12 to rotate in a seatbelt winding-up direction, an acceleration sensor 13 that detects an acceleration in a vehicle front-back direction, an emergency locking mechanism 14 activated when an acceleration detected by the acceleration sensor 13 is equivalent to an acceleration in an emergency event such as a vehicle collision to lock the rotation of the spindle assembly 12 in a seatbelt pulling-out direction and restrict pulling out operation of the seatbelt, a pretensioner 15 activated in the initial stage of an emergency event such as a vehicle collision to rotate the spindle assembly 12 in the seatbelt retracting direction, and a force limiter mechanism 16 that owes the withdrawal of the seatbelt while absorbing energy when a set load or more is applied on the seatbelt.

The retractor frame 11 is made of a metal and in a substantial U shape and includes a first side plate 11a positioned in the left part of FIG. 2 and a second side plate 11b positioned in the right part. The pretensioner 15 and the winding-up spring device 19 are attached to the first side plate 11a, and the emergency locking mechanism 14 and the acceleration sensor 13 are attached to the second side plate 11b. The second side plate 11b has an engagement inner teeth 11d with which a lock piece 20 that forms the emergency locking mechanism 14 can be engaged.

In other words, the winding-up spring device 19 and the pretensioner 15 are provided on one end side in the axial direction of the spindle assembly 12, and the pretensioner 15 has its main components stored in a tube cover 17 attached to the retractor frame 11. The acceleration sensor 13 and the emergency locking mechanism 14 are provided on the other end side in the axial direction of the spindle assembly 12 and stored in a cover 18 attached to the retractor frame 11.

Note that a tie plate 25 adapted to couple the free ends of the pair of side plates 11a and 11b, a seatbelt guide 27, and an upper stay 26 are attached to the retractor frame 11.

Any of various known arrangements can be applied as the emergency locking mechanism 14. Note that in FIG. 2, 31 designates a bearing plate having inner teeth with which a WS lever 34 operating together with an inertial member 32 can be engaged, and 33 designates a steering wheel provided with the inertial member 32 to support the WS lever 34 in a biased state by the spring 35 and engageable with a sensor lever of the acceleration sensor 13.

An automatic locking mechanism (ALR) 36 is provided on the axial outer side of the bearing plate 31, and 37 designates an ALR lever.

Figure 3:
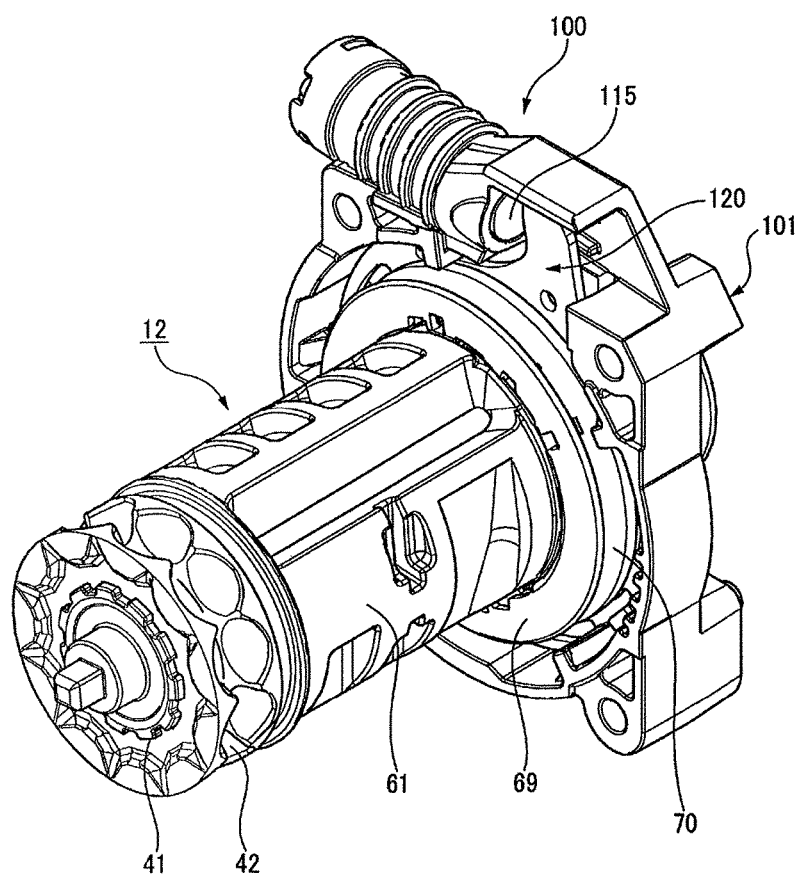
FIG. 3 is a perspective view of a spindle assembly and a switching mechanism.

The pretensioner 15 includes main components such as a driving device 51, a pinion 42, and a clutch mechanism 41 between the side plate 11a of the retractor frame 11 and the tube cover 17. The pinion 42 is a rotating member to be engaged with the spindle assembly 12 to rotate the spindle assembly 12 in the seatbelt winding-up direction in an emergency event. The clutch mechanism 41 allows the spindle assembly 12 to rotate freely when the pinion 42 does not rotate and engages the pinion 42 with the spindle assembly 12 when the pinion 42 rotates, so that the rotation of the pinion 42 is transmitted to the spindle assembly 12. Note that as shown in FIG. 3, the pinion 42 and the clutch mechanism 41 are pre-assembled in the spindle assembly 12. In FIG. 2, 44 designates a ball guide part, and 45 designates a ball guide plate.

As shown in FIG. 2, the driving device 51 includes a metal tube 52 partly held and fixed between the retractor frame 11 and the tube cover 17, a gas generator (MGG) 53 held and fixed on one end side of the tube 52, a piston 55 for example made of resin stored inside the tube 52, a plurality of balls 56 for example made of aluminum stored inside the tube 52 to form a ball chain, and a ball stopper spring 57 attached to the other end of the tube 52. Note that a ball engaged with the pinion 42 first among the plurality of balls 56 is a twin ball 58 including two integrally formed balls.

The gas generator 53 is activated initially in an emergency event to generate high pressure gas, and the piston 55 moves toward the tip end side of the tube 52 by the gas pressure generated by the gas generator 53 and transmits the force to the balls 56.

The plurality of balls 56 are pushed by the piston 55 to move and transmit the force to the pinion 42, which rotates the pinion 42. When, for example the balls 56 are moved by the piston 55, the balls 56 (including the twin ball 60) pushed out from the tip end side opening of the tube 52 sequentially engage with the pinion 42 to rotate the pinion 42. At the time, the tube 52 maintains combustion pressure by the gas generator 53 while storing the piston 55 and the plurality of balls 56 and functions to guide the movement of the piston 55 and the plurality of balls 56.

Figure 4:
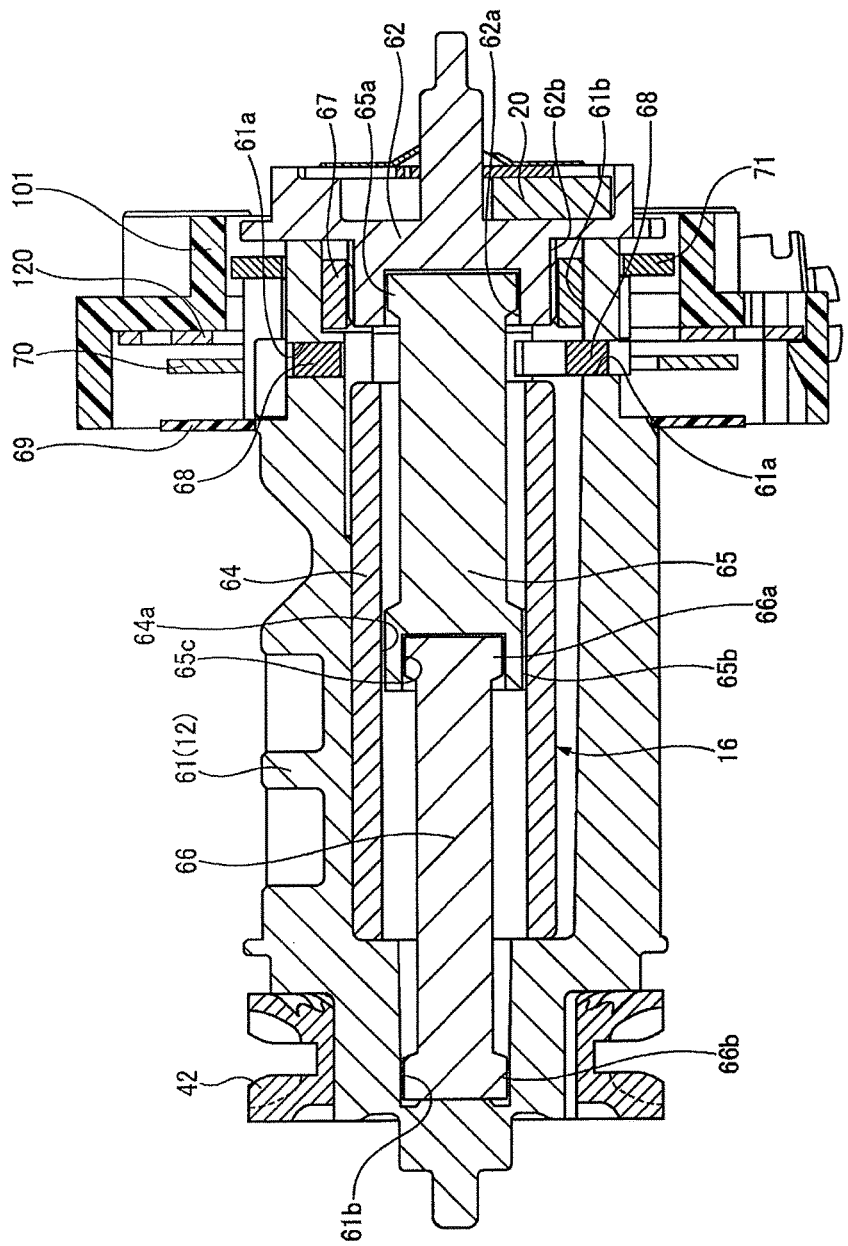
FIG. 4 is a sectional view of the spindle assembly and the switching mechanism.
Figure 5:
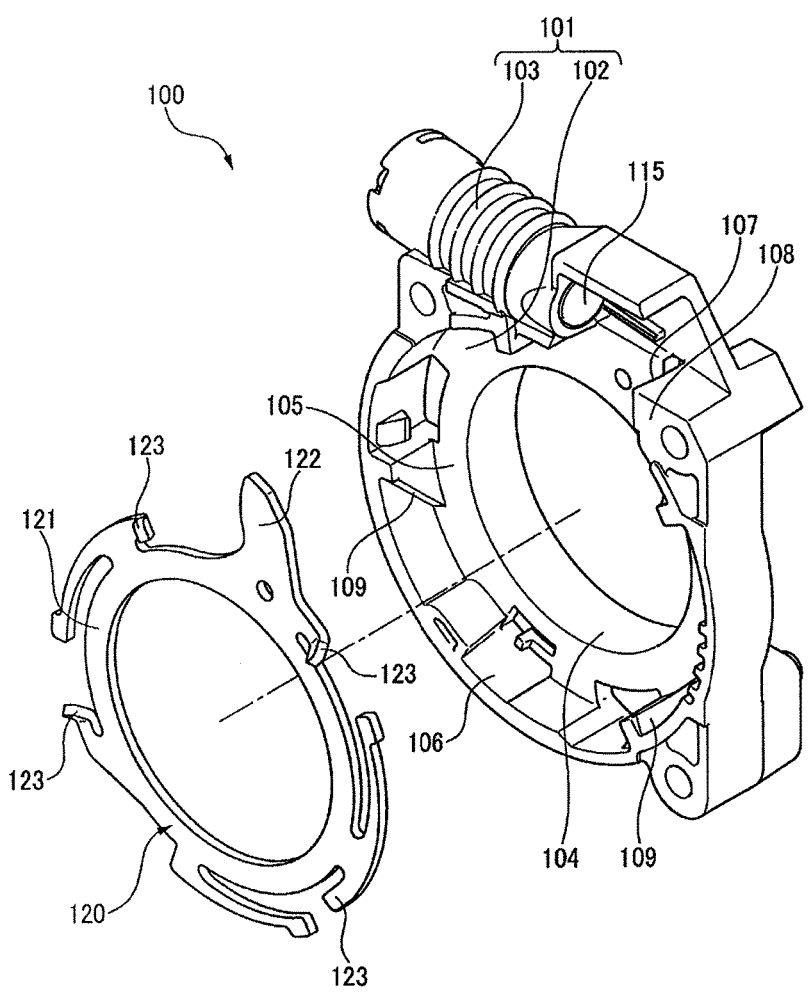
FIG. 5 is an exploded perspective view of the switching mechanism.
Figure 6:
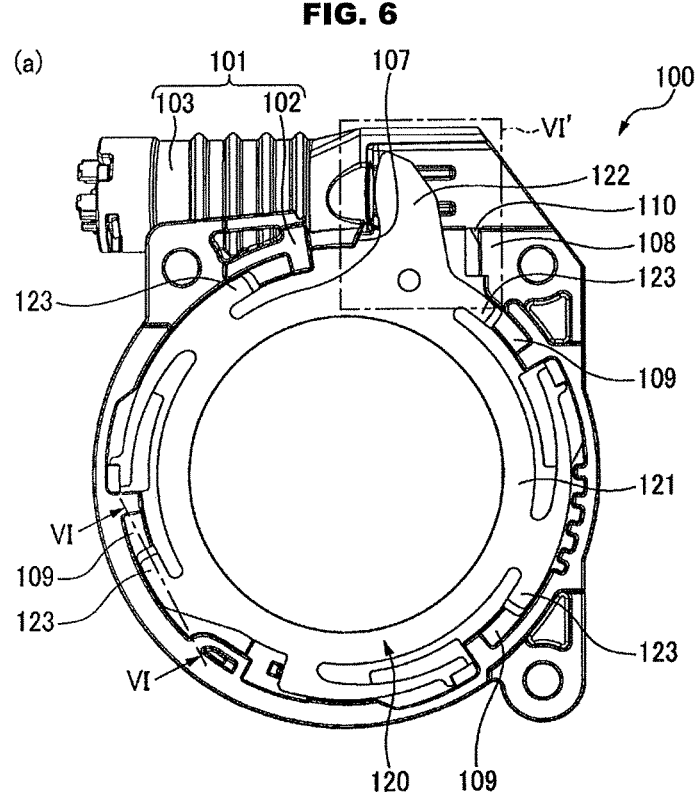
FIG. 6(a) is a front view of a switch ring, a switch piston, and a switch housing showing a state of the switching mechanism before activation.
FIG. 6(b) is a sectional view taken along line VI-VI in FIG. 6(a)
FIG. 6(c) is a perspective view of the part VI'.
Figure 6:
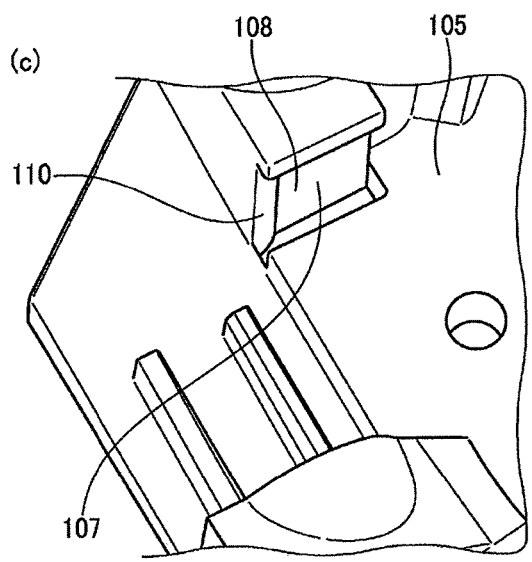
Figure 7:
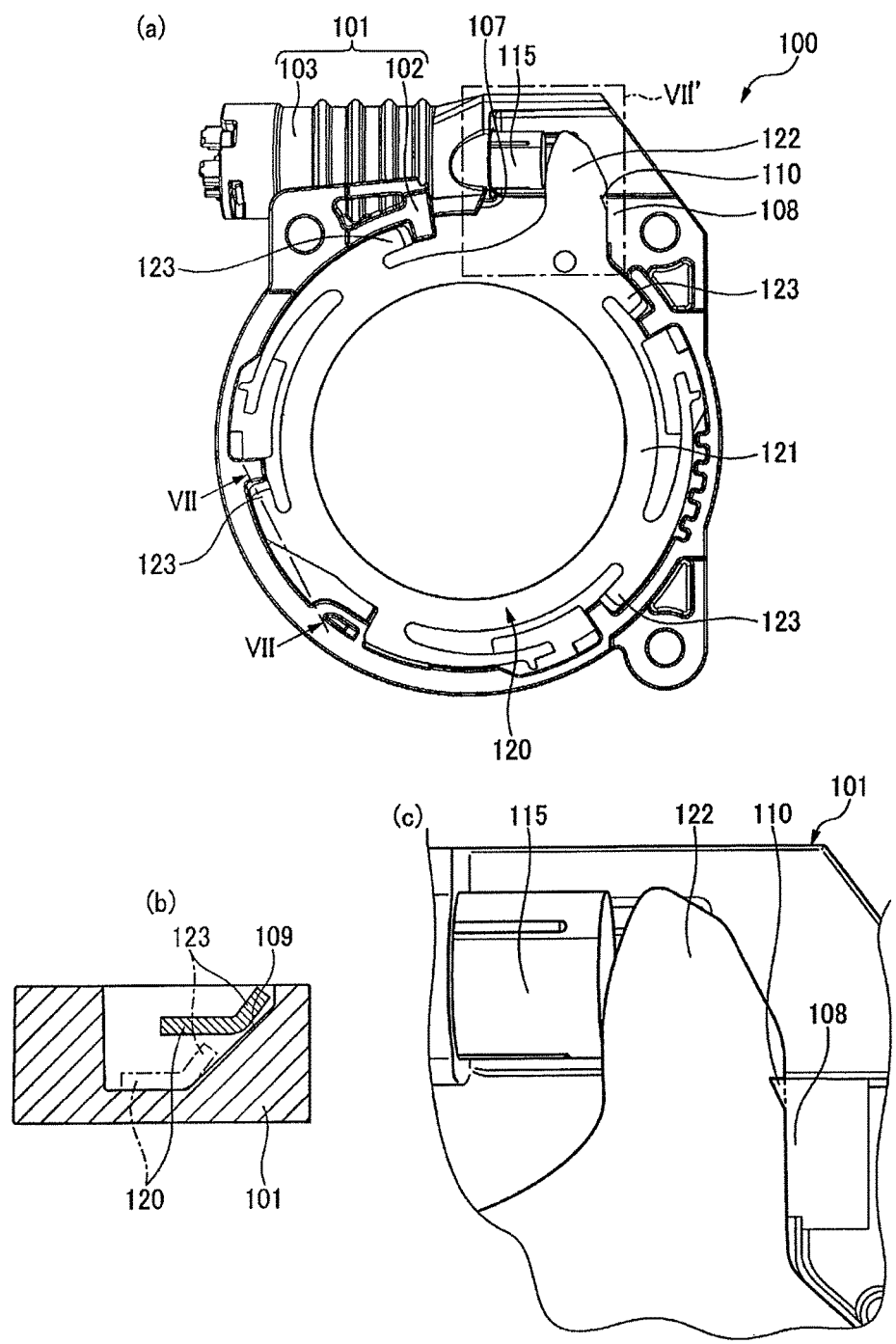
FIG. 7(a) is a front view of the switch ring, the switch piston, and the switch housing showing a state of the switching mechanism after activation.
FIG. 7(b) is a sectional view taken along line VII-VII in FIG. 7(a)
FIG. 7(c) is an enlarged view of the part VII'.
Figure 8:
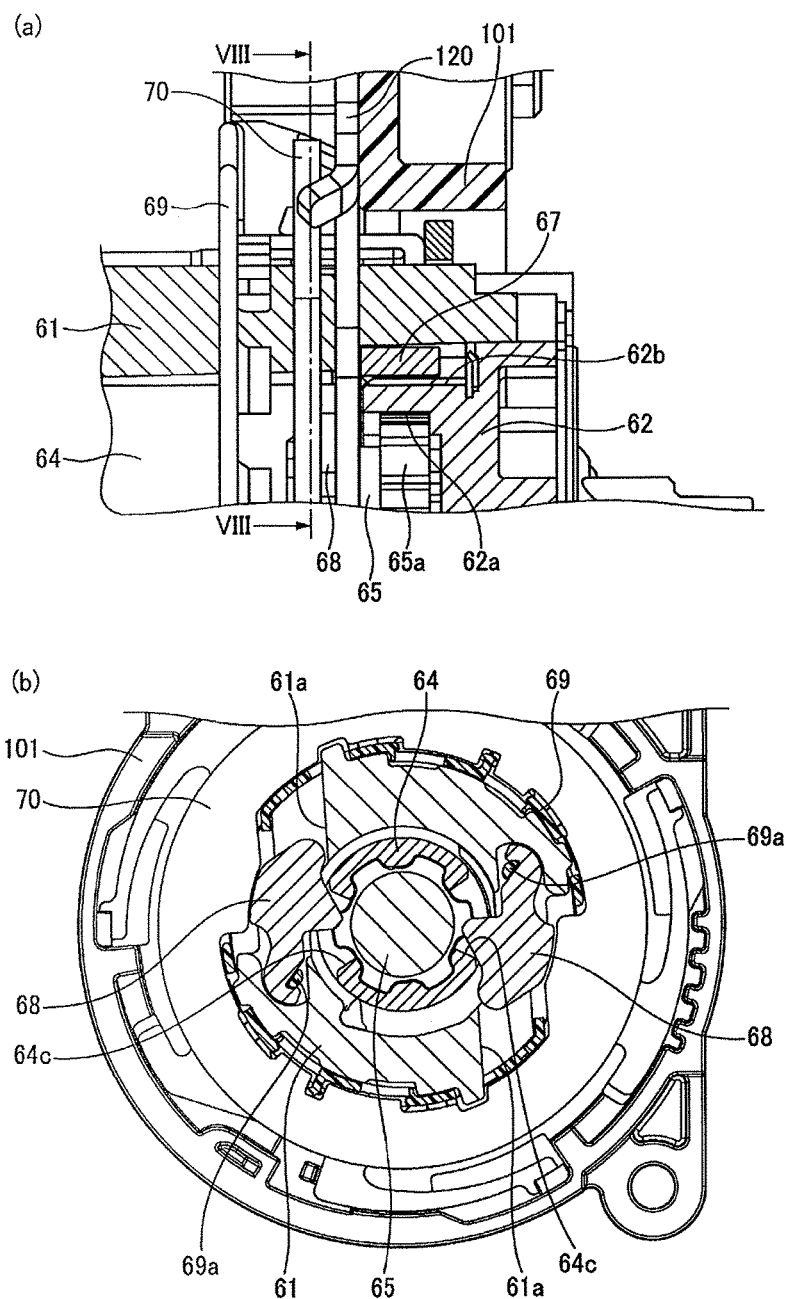
FIG. 8(a) is a view showing a state of the switch ring and the spindle ring before activation of the switching mechanism in relation to a sectional view of the spindle assembly.
FIG. 8(b) is the sectional view taken along line VIII-VIII in FIG. 8(a).
Figure 9:
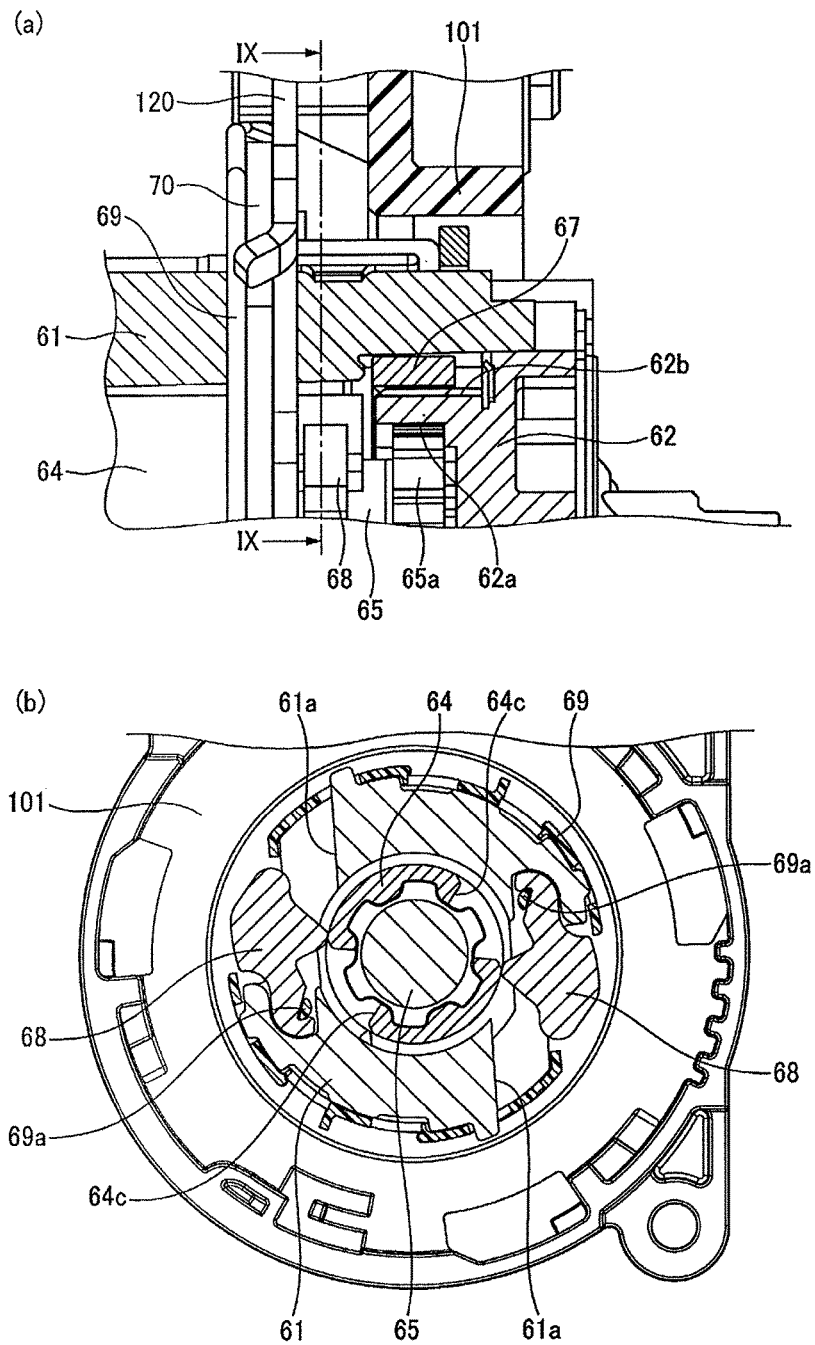
FIG. 9(a) is a view showing a state of the switch ring after activation of the switching mechanism in relation to a sectional view of the spindle assembly.
FIG. 9(b) is the sectional view taken along line IX-IX in FIG. 9(a).
Figure 10:
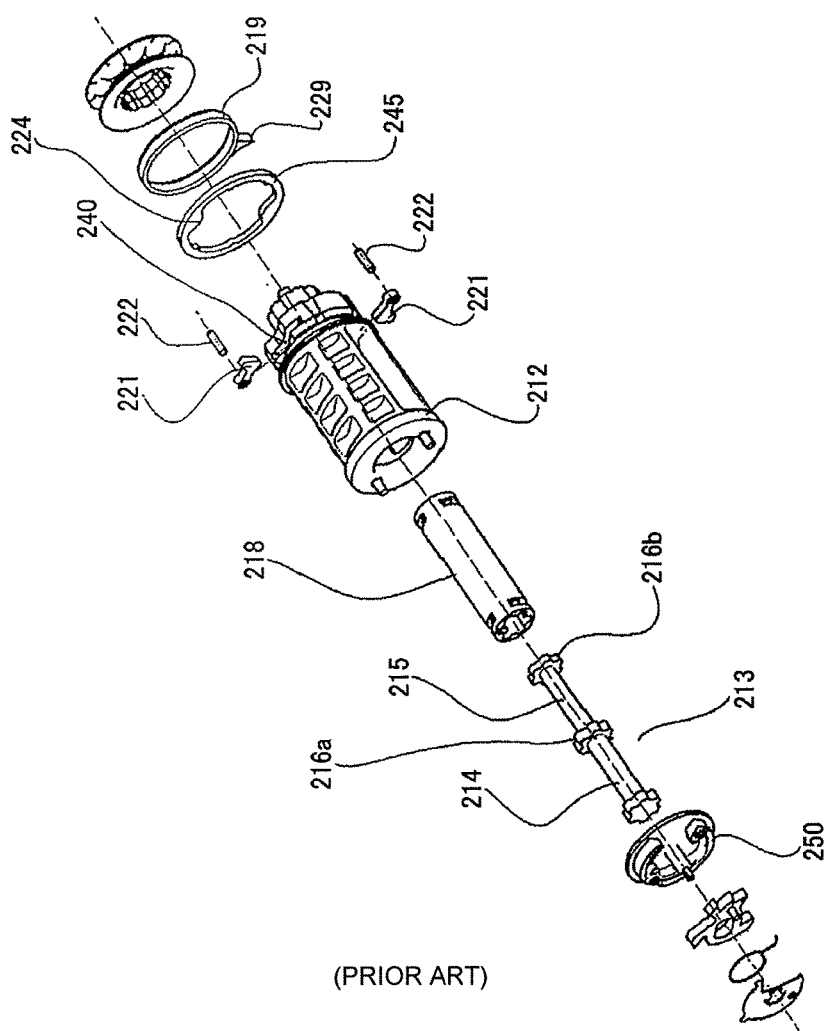
FIG. 10 is an exploded perspective view of a conventional seatbelt retractor.
Figure 11:
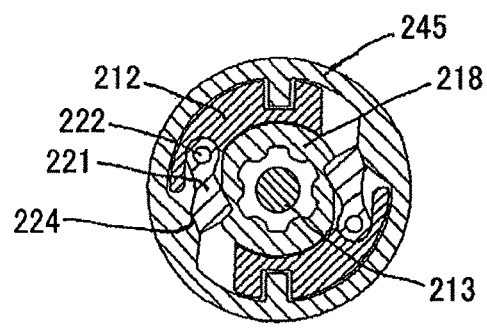
FIG. 11 is a sectional view of a conventional switching mechanism.
Figure 12:
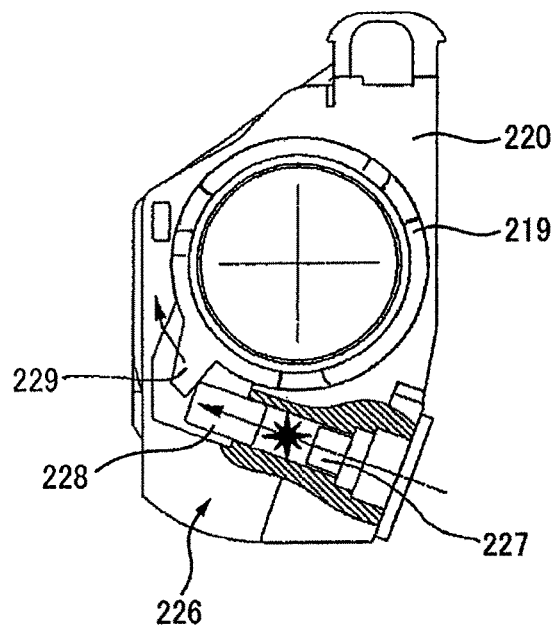
FIG. 12 is a general view of a driving device for the conventional switching mechanism.

As shown in FIG. 2 and FIG. 4, the spindle assembly 12 includes a spindle 61, a tread head 62 that blocks the opening of the spindle on one end side, the pinion 42 attached to the other end side of the spindle 61, a torque tube 64 provided in the spindle 61, first and second torsion bars 65 and 66 provided in the spindle 61 to form different shaft parts of the torsional torque, and an energy absorption stopper (hereinafter also referred to as "EA stopper") 67 provided between an inner circumferential surface of the spindle 61 and an outer circumferential surface of the tread head 62.

The spindle assembly 12 further includes the lock piece 20 guided at the outer circumferential surface of the tread head 62, a locking element 68 rotatably attached in a pair of through holes 61a formed at one end side of the spindle 61, an end piece 69 mounted around the spindle 61 from one end side of the spindle, a spindle ring (restriction ring) 70, and a support ring 71. Note that in FIG. 2, 72 designates an omega spring, and 73 designates a safety plate.

The first torsion bar 65 is formed to have a greater shaft diameter than the second torsion bar 66, and the ends 65a, 65b, 66a, and 66b of the torsion bars are formed in the shape of Torx (registered trade mark). According to the embodiment, the first torsion bar 65 having the greater shaft diameter absorbs energy in a high load level, and the second torsion bar 66 having the smaller shaft diameter absorbs energy in a low load level. The first torsion bar 65 has its thickness and hardness designed so that the first torsion bar has a greater torsional torque than a torque generated by activation of the pretensioner 15.

The inner circumferential surface of the end of the first torsion bar 65 has a hole 65c in the Torx shape, and as the end 66a of the second torsion bar 66 is fitted in the hole 65c, the first torsion bar 65 and the second torsion bar 66 are coupled.

A Torx-shaped hole 62a is formed at the inner circumferential surface of the tread head 62, and the one end 65a of the first torsion bar 65 is fitted in the hole. An annular groove 64a in the Torx shape is provided at the inner circumferential surface of the torque tube 64 from the tread head side beyond the intermediate point in the axial direction, and the other end 65b of the first torsion bar 65 is fitted in the groove. The other end 66b of the second torsion bar 66 is fitted and fixed in a Torx-shaped recess 61b formed at the inner circumferential surface on the other end side of the spindle 61.

As shown in FIG. 8(b), the locking element 68 is attached in the through hole 61a formed in the spindle 61 and pivots around a pivot center 69a formed at the end piece 69 so that the locking element 68 can advance or withdraw in a coupling recess 64c formed at the end of the torque tube 64.

While the locking element 68 is pressed against the inner circumferential surface of the spindle ring 70, the locking element advances in the coupling recess 64c of the torque tube 64 and is restricted from pivoting. In this way, the torque tube 64 is coupled to the spindle 61 through the pair of locking elements 68, so that the spindle 61 and the torque tube 64 rotate together. The end piece 69 is made of resin and positions the spindle ring 70 with respect to the spindle 61 in a fixed manner in the circumferential direction.

When the outer circumferential surface of the locking element 68 is released from the spindle ring 70, the locking element 68 can pivot outward in the radial direction as shown in FIG. 9(b), and the spindle 61 and the torque tube 64 can rotate relatively to each other.

Therefore, the locking element 68 can move to a locking position (see FIG. 8(b)) in which the torque tube 64 is locked with respect to the spindle 61 so that the torque tube 64 rotates together with the spindle 61 and an unlocking position (see FIG. 9(b)) in which the locking of the torque tube 64 with respect to the spindle 61 is released so that the torque tube 64 rotates relatively to the spindle 61.

The spindle ring 70 abuts against the locking element 68 in the radial direction and restricts the locking element 68 in the locking position.

In this way, the locking elements 68 and the spindle ring 70 form a locking mechanism that locks the torque tube 64 with respect to the spindle 61 so that the torque tube 64 rotates together with the spindle 61.

Referring back to FIG. 4, the EA stopper 67 has its outer circumferential surface formed into a polygonal shape and its inner circumferential surface formed into an internal thread shape and is formed by a hexagon nut according to the embodiment. The EA stopper 67 has its outer circumferential surface fitted in a hexagon hole 61b at the end of the spindle 61 on the side of the tread head 62 and its inner circumferential surface engaged with the external thread part 62b of the tread head 62. In this way, when the EA stopper 67 rotates by the rotation of the spindle 61, the EA stopper 67 engaged with the external thread part 62b of the tread head 62 moves in the axial direction. When the EA stopper 67 hits the inside stopper wall of the tread head 62, the spindle 61 is restricted from further rotating with respect to the tread head 62.

Further as shown in FIG. 1 to FIG. 7, a switch housing 101, a switch ring 120, a switch piston (driving member) 115 adapted to activate the switch ring 120, and a switching gas generator 116 that generates gas for pushing the switch piston 115 are provided around the spindle 61 on the inner side of the second side plate 12b of the retractor frame 11. According to the embodiment, the switching mechanism 100 adapted to switch between the states in which the torque tube 64 and the spindle 61 rotate together and relatively to each other includes the locking element 68, the end piece 69, the spindle ring 70, the switch housing 101, the switch piston 115, the switching gas generator 116, and the switch ring 120.

The switch ring 120 is made of a single piece of a metal plate material. The switch ring 120 has a ring-shaped part 121 having such an inner diameter that the part is provided around the spindle 61 and the end piece 69, an operated part 122 allowed to protrude radially outwardly at a part of the circumference and hit by the switch piston 115 in operation, and bent parts 123 that extend in the circumferential direction in a plurality of circumferential locations (four locations in the embodiment) and bent in the axial direction on the outer side of the ring-shaped part 121.

The switch housing 101 is made of a resin material and has a housing main body 102 that stores the switch ring 120, and a tubular storage 103 provided on the housing main body 102 to store the switching gas generator 116 and the switch piston 115.

The housing main body 102 is provided with a through hole 104 through which the spindle 61 is provided, a guide surface 105 that guides the axial side surfaces of the ring-shaped part 121 and the operated part 122 of the switch ring 120 before operation and a cylindrical part 106 that extends axially from around the guide surface 105 and positioned around the switch ring 120 to guide the switch ring 120 when the switch ring 120 moves in the axial direction.

As shown in FIG. 6(b), the housing main body 102 includes a plurality of ramp surfaces 109 inclined in the moving direction of the switch ring 120 in positions facing to the bent parts 123 at the sliding surface on which the switch ring 120 slides. Therefore, as shown in FIG. 7(b), when the switch ring 120 rotates in the circumferential direction by the operation of the switch piston 115, the switch ring moves in the axial direction as the bent parts 123 slide along the ramp surfaces 109.

The cylindrical part 106 has an open part 107 having its upper part opened, and the guide surface 105 extends upward beyond the open part 107. The operated part 122 of the switch ring 120 extends above from the open part 107, one side surface of the operated part 122 in the circumferential direction is faced to the switch piston 115, and the other side surface of the operated part 122 in the circumferential direction is faced to an abutment part 108 of the cylindrical part 106 that defines the open part 107. The abutment part 108 is hit by the operated part 122 when the operated part 122 is driven to rotate by the operation of the switch piston 115 and restricts the movement of the switch ring 120 in the circumferential direction.

As shown in FIG. 6(c) and FIG. 7(c), a protrusion 110 that protrudes toward the operated part 122 axially extends at the upper edge of the abutment part 108. The protrusion 110 is formed into a substantially triangular shape when viewed in the axial direction, collapses and deforms as the operated part 122 of the axially moved switch ring 120 hits the protrusion, so that the switch ring 120 after the abutment is restricted from shifting in the axial direction.

Note that according to the embodiment, the protrusion 110 is formed integrally with the switch housing 101, but a discrete member that can be collapsed and deform easily may be fixed to the abutment part 108.

In this way, the switch ring 120 forms a rotatable switching member used to unlock the locking mechanism and axially moves the spindle ring 70 from the position in which the spindle ring abuts against the locking element 68 to a position apart from the locking element 68.

Now, the operation of the seatbelt retractor 10 according to the embodiment will be described.

In a normal state, the spindle assembly 12 rotates as the seatbelt wound around the spindle assembly 12 is pulled out for example by seatbelt pulling out operation by an occupant. The spindle assembly 12 is rotatably supported and therefore receives winding-up force by the winding-up spring device 19. When the occupant stops pulling out the seatbelt and lets go of the hold, the spindle assembly 12 rotates by the force of the winding-up spring device 19 and winds up the seatbelt.

Also in a normal state, the torque tube 64 and the spindle 61 rotate together by the function of the locking element 68, and therefore the load transmission path for the force for pulling out the seatbelt is from the spindle 61 through the locking element 68, the torque tube 64, and the first torsion bar 65 to the tread head 62.

Upon, for example, a smaller impact than a vehicle collision such as heavy braking, the pretensioner 15 is not activated and the emergency locking mechanism 14 prevents the seatbelt from being unreeled.

Upon receiving an impact exceeding a prescribed threshold such as a vehicle collision, the pretensioner 15 is activated, ignition current is passed from a known sensor unit to the gas generator 53 of the driving device 51, and the gas generator 53 is activated by ignition to generate high pressure gas.

The piston 55 is pushed by the gas pressure to move in the tube 52 toward the other end opening. The balls 56 are pushed by the piston 55 to sequentially move in the tube 52 toward the other end opening of the tube 52. At the time, the balls 56 are arranged with no gaps between each other to form a ball chain, and therefore the movement of the ball 56 adjacent to the piston 55 is transmitted to all the balls 56 of the ball chain, so that the twin ball 60 and the balls 56 are sequentially pushed out from the other end opening side of the tube 52.

The balls 56 pushed out from the opening at the tip end of the tube 52 are engaged with the pocket of the pinion 42, and the pinion 42 starts to rotate by the movement of the balls 56. The start of rotation of the pinion 42 causes the clutch mechanism 41 to be linked, so that the rotation of the pinion 42 is transmitted to the spindle assembly 12, and the spindle assembly 12 rotates.

At the time, the torque tube 64 and the spindle 61 rotate together, and therefore the second torsion bar 66 having the ends fitted in the torque tube 64 and the spindle 61 is unaffected by twisting force. In this way, the twisting of the second torsion bar 66 having a smaller shaft diameter and insufficient retraction of the seatbelt that would otherwise be caused by the force by the activation of the pretensioner can be eliminated. The first torsion bar 65 has a greater torsional torque than the torque generated by the activation of the pretensioner 15 or is set to have such a thickness and a hardness that the first torsion bar is not twisted (does not plastically deform) by the force of the pretensioner 15, so that the force of the pretensioner 15 can surely be transmitted to the spindle 61.

In this way, until the movement of the balls 56 of the pretensioner 15 is complete, the spindle 61 rotates in the winding-up direction and the seatbelt retracts, so that any slack in the seatbelt with respect to the occupant is tightened.

While the emergency locking mechanism 14 is locked to prevent the seatbelt from being pulled out for example in response to detection of a collision by the acceleration sensor 13, the inertial force of the occupant acts upon the seatbelt, and the seatbelt starts to be gradually pulled out.

In the force limiter mechanism 16, after the gas generator 53 is activated and the pretensioner 15 starts to retract the belt, the switching mechanism 100 is activated in appropriate timing. The activation timing for the switching mechanism 100 is preset appropriately for example in consideration of the vehicle and seatbelt characteristics. For example, the switching mechanism 100 may be set to be activated in a prescribed period (ms) after the pretensioner is activated.

The switching mechanism 100 receives current for switching, and the switching gas generator 116 is ignited. The pressure of the gas from the switching gas generator 116 activates the switch piston 115, and the switch ring 120 is pushed by the switch piston 115 to rotate and move in the axial direction.

As the switch ring 120 moves in the axial direction and the spindle ring 70 moves in the axial direction as a result, the locking element 68 is allowed to pivot in the radial direction of the spindle 61 in the coupling hole 61a of the spindle 61. Therefore, the locking element 68 moves from the inside of the coupling recess 64c of the torque tube 64 to the outside by the coupling recess 64c of the torque tube 64 formed to push out the locking element 68 in profile (see FIG. 6(b)). In this way, the spindle 61 and the torque tube 64 can rotate relatively to each other.

In this way, the load transmitting path for the force for pulling out the seatbelt is from the spindle 61 through the second torsion bar 66 and the first torsion bar 65 to the tread head 62.

While the tread head 62 is locked, when force in the belt pulling-out direction is applied, and the belt load reaches a torsional load for the second torsion bar 66, the second torsion bar 66 having a smaller shaft diameter in the force transmitting path plastically deforms and is twisted, the spindle 61 rotates, and the seatbelt is pulled out. Simultaneously with the twisting of the second torsion bar 66, the EA stopper 67 rotates together with the spindle and moves axially along the external thread part 62b of the tread head 62. Then, the EA stopper 67 abuts against the inside stopper wall of the tread head 62, and the movement is restricted, so that the second torsion bar 66 can be prevented from being twisted off.

Therefore, as the force limiter mechanism 16 functions, the second torsion bar 66 deforms to allow the seatbelt to be pulled out while absorbing the impact energy, and the EA stopper 67 functions to prevent the seatbelt from being pulled out eventually, so that the occupant is protected.

Therefore, in the seatbelt retractor 10 according to the embodiment, the switching mechanism 100 includes the locking mechanism adapted to lock the torque tube 64 with respect to the spindle 61 so that the torque tube 64 rotates together with the spindle 61, the switch ring 120 rotatable to unlock the locking mechanism, and the switch housing 101 that stores the switch ring 120, the switch piston 115 adapted to activate the switch ring 120, and the switching gas generator 116 that generates gas for pushing out the switch piston 115 upon activation of the switching mechanism. The switch housing 101 of the switching mechanism 100 has a protrusion 110 that protrudes in an incoming direction of the operated part 122 at the abutment part hit by the switch ring 120 allowed to rotate by the switch piston 115. In this way, the switch ring 120 activated by the switch piston 115 is restricted from shifting in the axial direction by the protrusion 110 of the switch housing 101 and operates stably, so that the switching mechanism 100 of the force limiter mechanism 16 may have improved operation stability while achieving cost reduction.

The protrusion 110 deforms as the switch ring 120 hits the protrusion, and therefore the switch ring 120 can be restricted from shifting in the axial direction.

The locking mechanism is attached on the spindle side in the through hole provided radially through the spindle 61 and includes the locking element 68 pivotable between the locking position in which the torque tube 64 is locked with respect to the spindle 61 so that the torque tube 64 rotates together with the spindle 61 and the unlocking position in which the torque tube 64 is unlocked from the spindle 61 so that the torque tube 64 rotates relatively to the spindle 61 and the spindle ring 70 that abuts against the locking element 68 in the radial direction to restrict the locking element 68 in the locking position. The switch ring 120 has the operated part 122 that can move axially to a position apart from the locking element 68 from the position in which the spindle ring 70 abuts against the locking element 68 and protrude radially to hit the protrusion 110 of the abutment part 108. The protrusion 110 extends in the axial direction toward the abutment part 108 and protrudes. In this way, if the switch ring 120 moves axially, the operated part 122 can surely cause the protrusion 110 to collapse and deform.

The switch housing 101 of the switching mechanism 100 includes, at the sliding surface on which the switch ring 120 slides, the ramp surfaces 109 inclined in the moving direction of the switch ring 120, and the switch ring 120 moves axially by sliding along the ramp surfaces 109 as the ring rotates in the circumferential direction by the operation of the switch piston 115. In this way, the rotational movement of the switch ring 120 can be translated into axial movement.

Note that the present invention is not limited to the embodiment and may be modified or improved as appropriate. Furthermore, the materials, shapes, sizes, numbers, arrangement locations, etc. of the elements according to the embodiment may be arbitrary and may not be limited thereto if the present invention can be achieved.

Note that the present invention is based on Japanese Patent Application No. 2014-215596 filed on Oct. 22, 2014, the disclosure of which is herein incorporated by reference.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt retractor, comprising:
    a retractor frame;
    a spindle rotatably supported by the retractor frame and capable of winding up a seatbelt therearound;
    a torsion bar provided in the spindle and having a first end coupled to the spindle and a plurality of shaft parts having different torsional torque characteristics;
    an emergency locking mechanism capable of locking rotation of the spindle by locking a second end of the torsion bar;
    a torque tube coupled to the torsion bar between the plurality of shaft parts and provided in the spindle; and
    a switching mechanism implementing switching between a first state in which the torque tube rotates together with the spindle and a second state in which the torque tube rotates relatively to the spindle,
    the switching mechanism further comprising:
    a locking mechanism locking the torque tube with respect to the spindle so that the torque tube rotates together with the spindle;
    a switching member capable of rotating to unlock the locking mechanism;
    a housing storing the switching member, a driving member adapted to activate the switching member, and a gas generator that generates gas for pushing out the driving member upon activation of the switching mechanism,
    the housing of the switching mechanism having a protrusion that protrudes in an incoming direction of the switching member at an abutment part, the switching member hitting the abutment part when the switching member is rotated by the driving member.

2. The seatbelt retractor according to claim 1, further comprising the protrusion deforms when the switching member hits the protrusion.

3. The seatbelt retractor according to claim 1, wherein the locking mechanism comprises:
- a locking member attached on a spindle side in a through hole provided radially through the spindle and rotatable between a locking position associated with the first state in which the torque tube is locked with respect to the spindle so that the torque tube rotates together with the spindle and an unlocking position associated with the second state in which the torque tube is unlocked from the spindle so that the torque tube rotates relatively to the spindle, and
- a restriction ring radially abutting against the locking member to restrict the locking member in the locking position,
- the switching member is a switch ring having an operated part that is movable axially from a first position in which the restriction ring abuts against the locking member, to a second position apart from the locking member and that is allowed to protrude radially and hit the protrusion at the abutment part, and
- the protrusion extends axially to protrude in the incoming direction of the switching member.

4. The seatbelt retractor according to claim 3, wherein the housing of the switching mechanism comprises a plurality of ramp surfaces inclined in a moving direction of the switch ring at a sliding surface on which the switch ring slides, and
- the switch ring moves axially by sliding along the plurality of ramp surfaces while rotating in a circumferential direction by activation of the driving member.

5. The seatbelt retractor according to claim 3, further comprising the protrusion is formed into a substantially triangular shape and collapses and deforms as the operating part of the switch ring when moving axially hits the protrusion wherein the switch ring is restricted from shifting in the axial direction.

6. The seatbelt retractor according to claim 1, further comprising the switching member after hitting the abutment part when the switching member is rotated by the driving member is restricted from further movement in the circumferential direction.

7. The seatbelt retractor according to claim 1, further comprising the protrusion is formed integrally with the housing.

* * * * *